United States Patent [19]

Sandhu

[11] Patent Number: 4,788,865
[45] Date of Patent: Dec. 6, 1988

[54] CONSTRUCTION OF LIQUID CRYSTAL CELL FOR ACOUSTIC IMAGING

[75] Inventor: Jaswinder S. Sandhu, Buffalo Grove, Ill.

[73] Assignee: Raj Technology, Inc., Morton Grove, Ill.

[21] Appl. No.: 935,013

[22] Filed: Nov. 26, 1986

[51] Int. Cl.$^4$ .................... G01N 29/04; G02F 1/11
[52] U.S. Cl. ........................ 73/603; 350/330
[58] Field of Search .............. 73/603, 604; 350/330; 367/7, 8, 10

[56] References Cited

U.S. PATENT DOCUMENTS

| | | |
|---|---|---|
| 3,597,043 | 8/1971 | Dreyer . |
| 3,737,573 | 6/1973 | Kessler . |
| 3,831,434 | 8/1974 | Greguss . |
| 3,979,565 | 9/1976 | McShane ............ 310/336 |
| 3,991,606 | 11/1976 | Dreyer . |
| 4,211,948 | 7/1980 | Smith et al. ............ 73/644 |
| 4,338,821 | 7/1982 | Dion ...................... 73/603 |
| 4,379,408 | 4/1983 | Sandhu .................. 73/603 |
| 4,506,550 | 3/1985 | Sandhu .................. 73/603 |
| 4,651,567 | 3/1987 | Sandhu .................. 73/603 |

OTHER PUBLICATIONS

Dion et al., "Pseudo-Holographic Acoustical Imaging with a Liquid Crystal Convertor", vol. 10, *Acoustical Imaging*, Plenum Press, 1982, pp. 151–166.

*Primary Examiner*—John Chapman
*Attorney, Agent, or Firm*—Hill, Van Santen, Steadman & Simpson

[57] ABSTRACT

An acoustic imaging system which employs a liquid crystal cell for detecting acoustic energy and displaying an image. The cell includes a layer of liquid crystal material which is disposed between and encapsulated by a pair of cover members. At least one of the cover members is a laminated structure having at least two plies. The plies are of different materials and the thickness of each ply is governed by the expression $n\lambda/2$, where $n$ is an integer, and $\lambda$ is the wavelength of the acoustic energy in the cover materials. This structure enhances cell rigidity and the uniform of thickness of the liquid crystal layer in larger sized cells, while maintaining good transmission for energy angularly incident on the cell.

17 Claims, 1 Drawing Sheet

U.S. Patent  Dec. 6, 1988  4,788,865
FIG. 1
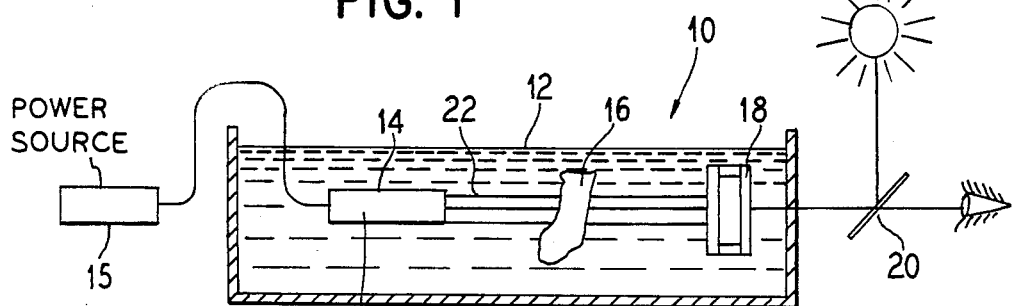
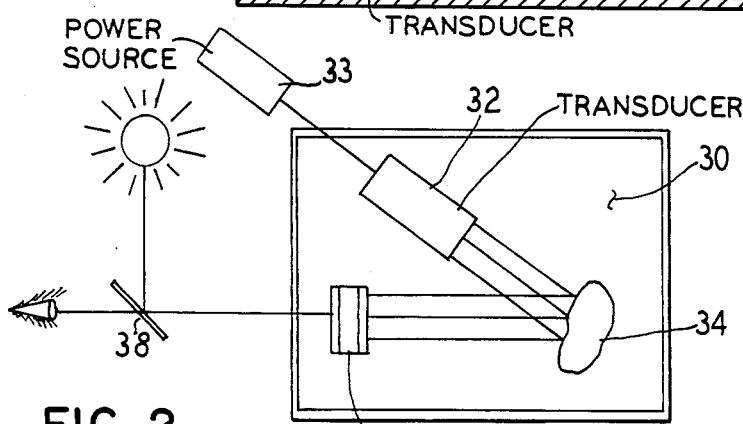
FIG. 2
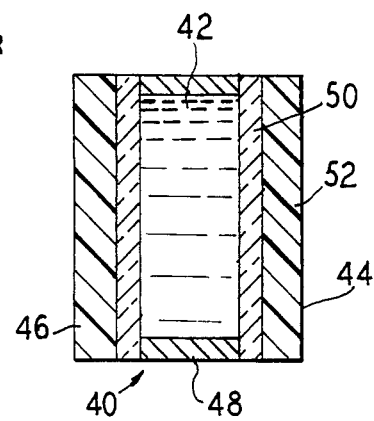
FIG. 3
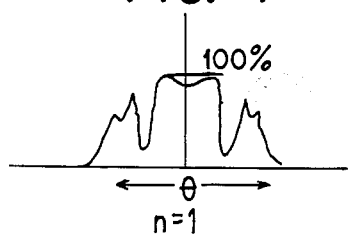
FIG. 4
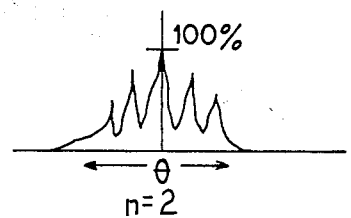
FIG. 5
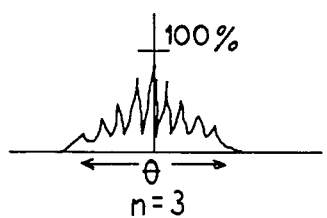
FIG. 6
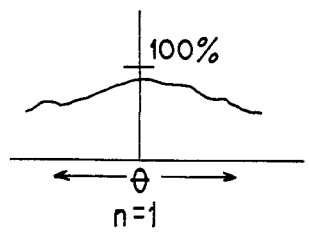
FIG. 7
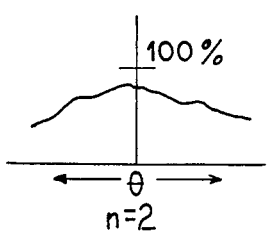
FIG. 8
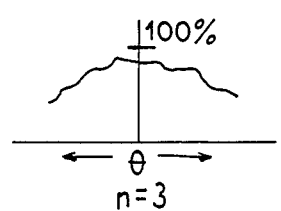
FIG. 9

CONSTRUCTION OF LIQUID CRYSTAL CELL FOR ACOUSTIC IMAGING

BACKGROUND OF THE INVENTION

This invention relates to liquid crystal based acoustic imaging systems employed in nondestructive testing, and more particularly, to the construction of the liquid crystal cells for use in such testing.

Nondestructive testing systems are used both industrially and medically in order to examine objects for internal features, defects, or the like. There are several types of nondestructive testing devices. In ultrasonic systems, the object is insonified with acoustic energy from an ultrasonic transducer and transmitted or reflected acoustic energy is analyzed for flaws or other internal features of the object.

In one specific form, the object is insonified using an ultrasonic transducer and the acoustic energy passing through or reflected from internal features of the object is detected by and is displayed on a liquid crystal cell. In such a system, the transducer, object and cell are acoustically coupled with a medium such as water.

Typical liquid crystal cells include a layer of liquid crystal material between 5 and 200 microns thick, which is usually of the nematic type exhibiting homeotropic alignment. The liquid crystal layer is disposed and encapsulated between a pair of acoustically transparent covers or substrates. A peripheral seal is provided between the covers for spacing the covers from each other and encapsulating the liquid crystal layer therebetween.

Liquid crystal cells in which a layer of liquid crystal material is encapsulated are known in the art. See, for example, U.S. Pat. Nos. 3,597,043 and 3,991,606 Dreyer; 3,707,323 Kessler; U.S. Pat. No. 3,831,434 Greguss; U.S. Pat. No. 4,338,821 Dion; and U.S. Pat. Nos. 4,379,408 and 4,506,550 Sandhu. See also, "PseudoHolographic Acoustical Imaging with a Liquid Crystal Converter", Dion et al, *Acoustical Imaging*, Vol. 10, Plenum Press, 1982. With regard to the cell covers, the art generally discloses the use of glass, sometimes a single sheet, as the cover material. Some of those patents disclose a specific thickness, and Greguss discloses that the thickness of the glass cover through which acoustic energy enters the cell is governed by the relationship $t = n\lambda/2$, where: $t$ = thickness, $n$ is an integer greater than or equal to 1, and $\lambda$ is the wavelength of the acoustic energy in the entering cover material. When $n = 1$, about 100% transmission is achieved where the ultrasonic beam is incident on the cover at normal and near normal angles (e.g., between $\pm 12°$ of normal). Cells $2'' \times 2''$ have been successfully made and used where $n = 1$. However, when $n > 1$ and the beam is not normal or near normal, then transmission is less than about 100% and image quality degrades due to factors such as multiple reflections, etc.

In order to permit liquid crystal cells to be used in situations where the beam is not at normal incidence, but at an angle, covers formed of laminated layers have been disclosed. See, for example, Dion U.S. Pat. No. 4,338,821 and Sandhu U.S. Pat. No. 4,379,408. Sandhu discloses laminated covers where the layer thickness is much, much less than $\lambda/4$ (i.e., $t << \lambda/4$). Dion discloses stratified walls having three layers $d_1$, $d_2$ and $d_3$, where $d_1$ and $d_3$ are between 100 and 200 microns thick and $d_2$ is between 15 and 125 microns thick. The Dion layers are not governed by the $n\lambda/2$ relation.

It has been found that large size cells flex and are not sufficiently rigid. For example, a $6'' \times 6''$ single sheet glass cover where the thickness is governed by $n\lambda/2$, $n = 1$ and the ultrasonic frequency is 3.5 MHz, is about 728 microns or 0.028 inches thick and may flex. Such flexing causes undesirable nonuniformities in liquid crystal layer thickness, which in turn has resulted in changes in image quality. At greater thicknesses (i.e., where n is 2, 3, 4 . . . ), the cover is more rigid, and normal alignment of the beam and cell cover becomes more critical. In other words, there is less tolerance for angular incidence.

Prior art cells, such as Dion, have laminated covers, and while providing increased angular tolerance, may exhibit undesirable flexibility or undesirable layer or ply thickness variations. Furthermore, handling of the very thin plies or layers needed for the laminated covers may pose problems in the large scale manufacture of liquid crystal cells.

It is therefore an object of this invention to provide a cell construction which will allow the ultrasound beam to be detected over a large angular range about the cell normal.

It is another object of this invention to provide a cell cover construction which is more rigid than prior constructions.

It is further object of this invention to enhance angular transmission and rigidity.

It is yet another object to provide cell covers which are readily manufactured.

These and other objects of this invention will become apparent from the following disclosure and appended claims.

SUMMARY OF THE INVENTION

This invention provides an improved cell cover for use in liquid crystal cells, which cover is rigid for maximizing uniformity of the liquid crystal layer thickness, reduces beam alignment problems, maximizes angular detection capability and can be effectively handled in a large scale manufacturing process.

The cell cover is a laminated structure of two different materials with the thickness of each material governed by $n\lambda/2$. For example, one layer or ply may be glass and the other a plastic or polymeric material such as polymethylmethacrylate (e.g., Plexiglas), each having a thickness equal to $\lambda/2$. The layers can be bonded together with very thin layers of an adhesive such as polymethylmethacrylate cement. It is noted that the wavelength in glass and plastic are different. Thus the actual layer thicknesses are different. This structure exhibits improved rigidity due to the increased thickness, while maintaining good angular tolerance (e.g., $\pm 12°$) and is easily manufactured.

BRIEF DESCRIPTION OF THE DRAWINGS

FIG. 1 is a diagrammatic view showing a transmission-type ultrasonic inspection system;

FIG. 2 is a diagrammatic view showing a reflection-type ultrasonic inspection system;

FIG. 3 is a sectional view of a liquid crystal cell construction;

FIGS. 4, 5 and 6 are graphic representations of the transmission characteristics of a glass layer; and FIGS. 7, 8 and 9 are graphic representations of the transmission characteristics of a polymer layer.

DESCRIPTION OF THE PREFERRED EMBODIMENT

Referring now to the drawings, a transmission-type acoustic, nondestructive inspection system 10 is shown. The system includes a bath 12 for the coupling medium, which is usually water, in which the system is operated. There is provided a sound source or transducer 14, usually an ultrasonic transducer driven by a power source 15, an object 16 to be inspected, and a liquid crystal cell 18.

An optical system 20 generally, is provided for use in viewing the cell. The optical system includes a source of illumination, half-silvered mirror and appropriate polarizers and analyzers which are not shown herein.

In the transmission mode, the transducer 14 is energized and emits acoustic energy in the form of an ultrasonic beam or field 22. Here the beam insonifies the object and passes through and exits the object. The exiting acoustic energy carries information regarding the internal structure or features of the object.

The exiting energy is incident on the object side of the liquid crystal cell, interacts with the liquid crystal material, and produces an image of the object that is displayed on the cell. The image is viewed from the other side of the cell using the optical system 20.

A reflective system is shown in FIG. 2 and includes a bath 30, transducer 32, a power supply 33 for driving the transducer 32, object 34, liquid crystal cell 36 and optical viewing system 38. A major difference between the transmission and reflection systems is that in the transmission system energy passing through the object is detected and is displayed, whereas in the reflective system, energy reflected from internal features of the object is detected and is displayed.

The liquid crystal cells of this invention are used in both systems. The choice of which system to use is based on object size, geometry, feature to be inspected for, size of bath, available inspection space, and the like.

A liquid crystal cell 40 is shown in FIG. 3. The cell 40 includes a liquid crystal layer 42 encapsulated between a viewing side cover 44 and an object side cover 46. A peripheral spacer 48 seals the liquid crystal material between the covers 44 and 46.

The liquid crystal may be a material, such as K15 (4-cyano-4'-n-pentyl biphenyl) and is between 5 and 200 microns thick.

In the embodiment shown, each of the covers is a laminated two-ply structure. For example, the viewing side cover 44 incldues an inner glass ply 50 and an outer plastic or polymeric ply 52 (e.g., polymethylmethacrylate or Plexiglas). These plies may be adhesively bonded together, for example, with a thin layer of polymethylmethacrylate cement whose acoustic properties can be ignored here. Each of the plies is optically transparent and is substantially acoustically transparent as set forth hereinafter. The thickness of each ply is defined by the relationship $t = n \lambda/2$, where $n=1$. Thus the cell is matched to the ultrasonic source and specifically the wavelength ($\lambda$) or frequency of the acoustic energy. For example, when using a 3.5 MHz sound source, the wavelength of sound in glass is $1454.3 \times 10^{-6}$ meters and in a plastic such as Plexiglas as $765.7 \times 10^{-6}$ meters. Based on the n $\lambda/2$ relationship, where $n=1$, the thickness of the glass layer is 727.14 micrometers or 0.028 inch, and the thickness of the plastic layer is 382.8 micrometers or about 0.015 inch. The total thickness of the cover is about 0.043 inch, which is sufficiently rigid to maintain a uniform liquid crystal thickness in cells larger than $2'' \times 2''$.

Thicker and more rigid cell covers can be fabricated using plies wherein n is 2 or 3, etc. This would result in a thicker, more rigid, although somewhat heavier cell, which may be necessary and acceptable in very large displays.

The acoustic transmission characteristics of the individual plies for laminated covers are seen in FIGS. 4-9, inclusive. FIGS. 4, 5 and 6, show the transmission characteristics for a glass ply where the thickness is determined by n $\lambda/2$, where $n=1$, 2 and 3, respectively. It is seen that in FIG. 4, where $n=1$, the glass ply will transmit almost 100% of the incident acoustic energy at angles ($\theta$) between about $\pm 1°$ of normal. Where $n=2$, the angular range for such high transmission is much less (for example, on the order of $\pm 2°$). Where $n=3$, the angular range for high transmission is still less (for example, on the order of $\pm 1°$). Thus as the glass layer becomes thicker, near normal alignment becomes more critical and angular incidence is less tolerable.

The transmission characteristics for plastic is shown in FIGS. 7-9. In FIG. 7, transmission declines slowly as the angle of incidence ($\theta$) changes as compared to the glass plies seen in FIGS. 4-6. Transmission is relatively constant (e.g., approximately 85% for polymethylmethacrylate) in the angular range of about $\pm 25°$ of normal for $n=1$. Where $n=2$, as seen in FIG. 8, while some transmission loss is suffered, transmission is similar although in a somewhat smaller angular range. Furthermore, where $n=3$, high transmission is also exhibited.

Thicker, more rigid covers can be fabricated where $n=1$ for the glass inner ply and $n=2$ or 3 for the outer plastic or polymeric ply. In this manner a thicker more rigid cover is provided without significant loss of angular transmission since the angular transmission for the plastic ply is greater than for the glass ply. On the other hand, if a glass ply was used where $n=2$ or 3, the range of angular transmission would be more restricted. It is to be noted that glass is the controlling factor in determining the angular transmission range as its angular range is more restricted than plastic. Further, glass is preferred as the inner layer as it does not react with the liquid crystal material.

Thus based on a number of criteria, it is usually beneficial to employ an inner glass ply where $n=1$ and an outer plastic ply, such as polymethylmethacrylate, where $n=1$ or more.

While polymethylmethacrylate has been disclosed as one specific plastic for use herein, numerous plastics can be used such as polystyrenes, polycarbonates, polyesters, etc. However, it is to be noted that the invention is not based on the particular chemical composition but rather on physical properties.

It is also significant to note the ratios of acoustic impedance between the various layers and coupling medium. In this case the ratios are between the glass layer and water ($Z_g/Z_w$) and the Plexiglas layer and water ($Z_p/Z_w$).

The impedance values are as follows:

$Z_{water} = 1.5 \times 10^6$ kg/m$^2$ sec $Z_{Plexiglas} = 3.16 \times 10^6$ kg/m$^2$ sec $Z_{glass} = 11.42 \times 10^6$ kg/m$^2$ sec The ratios are:

$$\frac{Z_g}{Z_w} = 7.6$$

$$\frac{Z_p}{Z_w} = 2.1$$

It is seen that the impedance of Plexiglas is closer to that of water than that of glass. These differences in impedance are believed to relate to the differences in angular transmission ranges. Therefore, when selecting a layer to be made thicker, it is preferable to select a lower impedance or ratio material than a higher impedance or ratio material since the lower impedance or ratio material will exhibit a smaller loss of angular transmission range.

In the preferred cell embodiment, both the viewing side and object side covers are each laminated members having two plies. However, the covers may have more than two plies (i.e., 3, 4, or more) so long as they follow the n $\lambda/2$ relationship. Moreover, the cell may be constructed where one cover is a single ply while the other is laminated.

Although the invention has been described with respect to preferred embodiments, it is not to be so limited as changes and modifications can be made which are within the full intended scope of the invention as defined by the appended claims.

I claim as my invention:

1. A liquid crystal cell for use in detecting acoustic energy and displaying an image, said cell having a layer of liquid crystal material disposed and encapsulated between a pair of substantially acoustically transparent covers, at least one of which is optically transparent, wherein:
   at least one of said covers is a laminated member and includes at least two plies of different materials, each of said plies having a thickness determined by the relationship t=n $\lambda/2$;
where:
   t is the individual ply thickness,
   n is an integer greater than or equal to one, and
   $\lambda$ is the wavelength of the acoustic energy, in the cover material, used to image the object.

2. A cell as in claim 1, wherein said cell covers are rigid and said liquid crystal layer is substantially uniform in thickness.

3. A cell as in claim 1, wherein said cover includes only two plies.

4. A cell as in claim 3, wherein both covers are laminated and each cover includes two plies.

5. A cell as in claim 3, wherein on ply is glass and the other is plastic.

6. A cell as in claim 5, wherein said plastic is polymeric.

7. A cell as in claim 6, wherein said polymer is polymethylmethacrylate.

8. A cell as in claim 5, wherein the thickness of the glass ply and the plastic ply are each determined where n=1.

9. A cell as in claim 6, wherein the thickness of the glass ply is determined where n=1.

10. A cell as in claim 3, wherein one ply is glass where n=1 and the glass ply exhibits substantial acoustic transmission in the angular range between about ±12° of normal to the ply; and the other ply is plastic, which exhibits substantial acoustic transmission over an angluar range greater than that of glass.

11. A cell as in claim 3, wherein the acoustic impedance of a first ply ($Z_1$) is greater than the acoustic impedance of a second ply ($Z_2$).

12. A cell as in claim 3, wherein said cell is adapted to contact an ultrasonic coupling medium and the ratio of acoustic impedance of a first ply to the coupling medium ($Z_1/Z_m$) is greater than the ratio of acoustic impedance of a second ply to the coupling medium ($Z_2/Z_m$).

13. A cell as in claim 12, wherein the coupling medium is water.

14. A cell as in claim 3, wherein n for the second ply is greater than n for the first ply.

15. A cell as in claim 3, wherein there is further provided a bonding layer disposed between said plies for securing said plies to each other.

16. A cell as in claim 3, and in combination therewith, a transmission type acoustic imaging system which includes means for insonifying an object with acoustic energy, said cell positioned for detecting energy passing through said object and for displaying an image and optical means for illuminating said cell for viewing said image.

17. A cell as in claim 3, and in combination therewith, a reflective type acoustic imaging system which includes means for insonifying an object with acoustic energy, said cell positioned to detect energy reflected from an object or internal features thereof and for displaying an image, and optical means, for illuminating said cell for viewing said image.

* * * * *